United States Patent
Norris

[11] 3,728,936
[45] Apr. 24, 1973

[54] ARMING AND SAFING DEVICE
[75] Inventor: Bob Norris, Silver Spring, Md.
[73] Assignee: The United States of America as represented by the Secretary of the Navy
[22] Filed: Dec. 3, 1964
[21] Appl. No.: 415,826

[52] U.S. Cl..............89/1.812, 89/1.5 D, 102/76 R
[51] Int. Cl. ..............................................F41f 3/04
[58] Field of Search....................102/70, 73, 78, 79, 102/70.2, 76, 82, 83; 89/1, 1.5

Primary Examiner—Samuel W. Engle
Attorney—G. J. Rubens and J. O. Tresansky

EXEMPLARY CLAIM

1. In a self-propelled fuel burning type missile of a character containing a nuclear warhead and adapted to be launched from a high speed aircraft, an arming and safing device for the warhead comprising,
    means responsive to gas pressure forces generated by fuel burned during missile propulsion and applied in a manner for driving timer mechanisms and closing respective contacts thereon which are incorporated in the warhead arming circuit,
    first and second releasable locking means for said timer mechanisms driving means,
    electrically actuated means responsive to an intent-to-launch signal generated from within the launching aircraft for unlocking said first locking means,
    and means responsive to forces and/or influences occasioned by the separation of the missile from the launching aircraft for unlocking said second locking means.

7 Claims, 1 Drawing Figure

PATENTED APR 24 1973
3,728,936
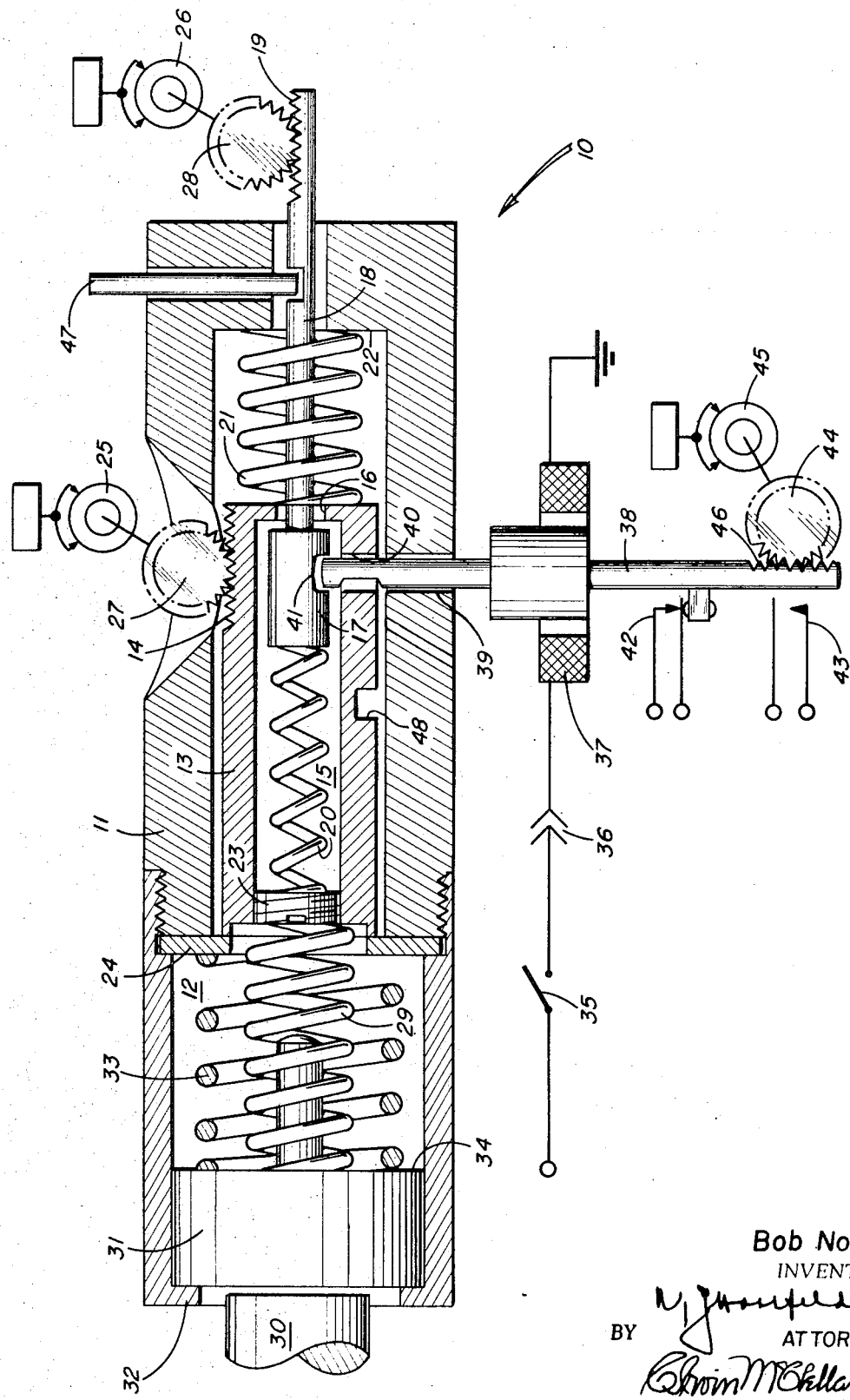
Bob Norris
INVENTOR.
BY
ATTORNEY.
AGENT.

ARMING AND SAFING DEVICE

The invention described herein may be manufactured and used by or for The Government of the United States of America for governmental purposes without the payment of any royalties thereon or therefor.

This invention relates to a safety and arming mechanism for a rocket-powered missile, and more particularly to such a mechanism for a low-g missile of the type adapted to be launched from a high speed aircraft.

A design criteria of fuzes for all nuclear warhead-bearing missiles of the air-launched variety requires the provision of a safety mechanism capable of withholding all arming signals and energy from the warhead until such a time that the missile has been properly launched and has attained a safe separation-distance from the launching aircraft. In the interest of achieving maximum range with minimum weight, designers of missiles of the character described have selected a relatively low-thrust, long-burning rocket motor. As might be expected, then, the relatively low velocity missile and high velocity aircraft combination has presented some major problems in the design of a suitable safe separation mechanism. One of the most prominent problems encountered, for example, lies in the fact that the aircraft has, in some cases, the capability of outflying and overrunning the missile at nominally short ranges.

Accelerations available from surface launched missiles are usually large compared with gravity and constitute an environment which is truly unique to flight. As a result, surface missiles have traditionally used missile acceleration or setback as a unique environment to determine that the missile has accomplished separation. Normally, in the interest of simplicity, safety, and reliability, some departures from a true double integration are deliberately introduced into the accelerometer design. Among these departures is the incorporation of a bias spring on the accelerometer mass to counter the action of the normal Earth's gravity, thereby establishing a threshold of acceleration which only the missile normal acceleration can exceed. If the acceleration persists until safe-separation is accomplished then the double time-integral of the acceleration can be interpreted directly as distance traveled. If the acceleration ceases before safe-separation occurs then the first time-integral of acceleration can be interpreted as missile velocity which, barring mid-air collision or some gross aerodynamic failure, can be used to develop considerable confidence that the missile will continue its flight and eventually reach safe-separation. Thereafter, it is then only necessary to allow sufficient time for the missile to reach safe-separation. The integration of acceleration, if the accelerometers are axially mounted, does not differentiate between normal and abnormal trajectories, indicating only axial travel or velocity. In order to determine true separation, therefore, the accelerometer information must be augmented by additional trajectory information. If the missile guidance system already contains this additional trajectory information, economy and reliability requirements would dictate that the missile adaption kit borrow this information from the missile rather than generate it independently.

Unfortunately, in the present case, there will not always be axial accelerations that are large compared to the Earth's gravitational pull since the missile is to be launched from a high speed aircraft which imparts a high initial velocity to the missile, with its attendant high drag force. Lacking this environment which is truly unique to flight, the adaption kit for the nuclear warhead of an air-launched missile must depend on a preponderance of available environments and other inputs so ordered and interlocked that they collectively constitute a unique indication of normal flight.

Therefore, it is an object of the present invention to combine the gas pressure generated by the missile propulsion motor, a mechanical latch or locking means actuated by a lanyard attached to the launching aircraft, and an electrical intent-to-launch signal into a device which can be used to close switches in critical circuits in the nuclear adaption kit of an air-launched missile, and so permissively arm the warhead.

Another object of the invention is to provide a rocket projectile fuze of sturdy construction which will arm only under the sustained pressure of the gases produced by the combustion of the rocket propellant for a predetermined period of time.

Still another object of the invention is to provide a fuze which will arm only after it has traveled a safe predetermined distance from the launching aircraft.

Yet another object is to provide a safety and arming mechanism that is rugged, simple, and reliable, and which does not depend on stored energy for arming.

Other objects and many of the attendant advantages of this invention will be readily appreciated as the same becomes better understood by reference to the following detailed description when considered in connection with the accompanying drawing wherein:

FIG. 1 is a longitudinal section of a preferred embodiment according to the present invention.

Referring now to the drawing, there is shown an arming and safing device 10 for a nuclear warhead comprising a housing 11 which is centrally bored to form a cavity 12. Cavity 12 contains a movable sleeve 13 having an integral rack portion 14 at one end thereof. Sleeve 13 is provided with a stepped bore cavity 15 for constraining movement relative to an opening or bore 16 in the rack end thereof of the large end or plunger portion 17 of a plunger or rod 18 having an integral rack portion 19 at the end thereof remote from the plunger portion 17. The stepped bore cavity 15 further contains a preloaded spring 20 which urges plunger end portion 17 of the plunger and rod assembly 18 toward the stepped bore end of the sleeve 13. A coil spring 21 is positioned between the face of the rack end of sleeve 13 and an internal stepped bore end wall 22 of housing 11, and normally urges the sleeve 13 toward and into abutting relationship with the annular flange 24.

A pair of clutched timers 25 and 26 are driven by their engagement with the racked portions 14 and 19, respectively, of sleeve 13 and plunger and rod assembly 18. The timer clutches 27 and 28 drive the timers 25 and 26, respectively, when sleeve 13 and plunger and rod assembly 18 move from left to right under the influence of a spring 29, and free wheel when sleeve 13 and plunger and rod assembly 18 return under the influence of spring 21. The timer 25 driven by the sleeve 13 regulates the time required for the sleeve to move the distance between notch 48 and lateral bore 40. Timer mechanism 26 driven by plunger and rod assembly 18 regulates the time, somewhat longer than that required for sleeve 13 to move the aforementioned distance, required to close final electrical contacts which are included in critical circuits in the adaption kit of the missile. Redundant contacts can be provided on timer 25 to decrease the fallibility of open switches due to random short circuits about each individual switch.

Sleeve 13 and plunger and rod assembly 18 derive the energy to operate their respective timer mechanisms from mechanical translation of a piston 30 which moves the piston 31 positioned within housing 11 at end 32 thereof, thereby compressing the preloaded compression spring 33, positioned between face portion 34 of piston 31 and the annular flange 24, and the nonloaded spring 29, which is positioned between face 34 and end portion 23 of sleeve 13. The energy stored in spring 29 is then available to supply energy to the sleeve 13 and the plunger and rod assembly 18. The device is so arranged within the missile that piston 30 translates as a result of rocket motor pressure forces.

Interlocks or restraints are imposed on the system and are designed to prevent any motion of sleeve 13 or plunger and rod assembly 18 unless certain requirements, hereinafter described, are fulfilled. Prior to launching of the missile from the launching aircraft a switch 35 must be closed to communicate an intent-to-launch or electrical unlock signal from the plane through an umbilical connector 36 to actuate an unlock solenoid 37. In the locked, unarmed position illustrated in the drawing, a solenoid armature-actuated and spring-urged plunger rod 38 extends through normally aligned bores or openings 39 and 40, respectively, in housing 11 and sleeve 13, and terminates in a notch 41 in the cylindrical plunger portion 17 of piston 18. When solenoid 37 is energized, plunger rod 38 is withdrawn against the action of its biasing spring, not shown, from plunger and rod assembly 18 and sleeve 13, opening external circuit monitor contact 42 and closing external circuit monitor contact 43. A one-way clutch 44 on a timer mechanism 45 attached to the plunger rod 38 through rack portion 46 thereon allows the plunger to be withdrawn immediately, but will time the spring-urged return of the plunger at some convenient time greater than the minimum time from launch to the appearance of rocket motor pressure forces. For example, if rocket motor gas pressure forces occur at approximately 3 seconds after launch, a timer mechanism delay of 6 or 8 seconds will insure that rocket motor pressure force has appeared before the plunger has time to relock the sleeve and plunger.

Upon ejection from the plane a lanyard 47 attached to the aircraft withdraws an additional mechanical latch or lock from the plunger and rod assembly 18 enabling the piston to move and operate the timer mechanism 26.

In normal use, then, the sequence of operations would be as follows: An electrical unlock signal from the plane is communicated through the connector 36 to the unlock solenoid 37, withdrawing plunger 38 from plunger 17 and sleeve 13. Upon ejection from the plane the lanyard 47 withdraws the lock from plunger and rod assembly 18, thereby unlocking the arming and safing device 10. Also at ejection the umbilical connection 36 of the intent-to-launch signal to the solenoid is broken, and the solenoid plunger 38 starts its timed return to a locked position. Shortly after the launching cycle has been initiated and the missile has been ejected, the rocket motor is ignited and pressure appears at the piston 30, causing piston 31 to move immediately to its full travel, compressing the two springs 33 and 29. The energy in spring 29 causes the sleeve 13 to move away from piston 31 and in so doing operates the timer 25. At the end of some time, as long as possible, but still shorter than the time required for the rocket motor to burn-out, the sleeve 13 moves a distance sufficient to allow the solenoid plunger 38 to move into notch 48 in the side wall of sleeve 13 thereby to relock the sleeve 13 in its extended position, or commit position. The solenoid plunger will have had time to return to a position to relock the sleeve in the blind hole at the extreme excursion of the sleeve.

When sleeve 13 moves under the influence of spring 29 the restraint is removed from plunger and rod assembly 18, which then moves under the influence of preloaded spring 20 until it is again in engagement with the sleeve. Since timer 25 runs faster than timer 26, the sleeve completes its full excursion and locks in the commit position before the plunger and rod assembly 18 has completed its travel. The plunger and rod assembly, then, completes its travel after the commit point has been reached, under the influence of spring 20.

If, for any reason, motor pressure is dissapated or interrupted before the end of the elapse time period as set into timer 25, spring 33 will return piston 31 to its original position, removing the loading from spring 29. Spring 21 then returns sleeve 13 to its original position, taking plunger and rod assembly 18 along with it, so that the solenoid plunger 38 may relock the device in a safe position. The clutches on the timers will allow immediate return.

The device is completely testable since all that is necessary to reset after a complete cycle of operation is to excite the solenoid from an external source. When a committed device is reset by exciting the solenoid, withdrawing the solenoid plunger 38, the spring 21 resets the device. The device cannot accidentally reset itself by means of a spurious signal after launching since it will be disconnected from the umbilical. Thus it may be seen that a device has been provided which interlocks and orders the inputs of motor pressure, lanyard operation and intent-to-launch signal as indicated hereinbefore to offer a rugged and reliable arming and safing device for a missile of the air-launched variety, which bears a nuclear warhead.

The device of the present invention affords safety in that it must receive an intent-to-launch signal from the aircraft prior to launching. It must be unlocked by the withdrawal of a mechanical latch or lock by the action of a lanyard attached to the launching aircraft. Finally, the device must be supplied with a mechanical input as a direct result of rocket motor pressure, the mechanical input being capable of supplying the basic energy to drive the timers and to close the timer contacts. Premature appearance of motor pressure shall preclude the functioning of the electrical intent-to-launch unlock. The lanyard lock, until properly removed, shall block movement of the plunger and rod assembly 18 even with complete defeat of the intent-to-launch and motor pressure restraints. It should be observed that the novel intent-to-launch signal, if made an independent operation by a crew member other than the member who normally launches the missile, can be used as an effective means of precluding an inadvertently launched live missile. This signal should not be automatically available upon missile launch or breakaway.

Obviously many modifications and variations of the present invention are possible in the light of the above teachings. It it therefore to be understood that within the scope of the appended claims the invention may be practiced otherwise than as specifically described.

What is claimed is:

1. In a self-propelled fuel burning type missile of a character containing a nuclear warhead and adapted to be launched from a high speed aircraft, an arming and safing device for the warhead comprising, means responsive to gas pressure forces generated by fuel burned during missile propulsion and applied in a manner for driving timer mechanisms and closing respective contacts thereon which are incorporated in the warhead arming circuit, first and second releasable locking means for said timer mechanisms driving means, electrically actuated means responsive to an intent-to-launch signal generated from within the launching aircraft for unlocking said first locking means, and means responsive to forces and/or influences occasioned by the separation of the missile from the launching aircraft for unlocking said second locking means.

2. The device of claim 1 wherein the timer mechanisms driving means comprises a housing having a longitudinal cavity therein, a sleeve element movable within the cavity of said housing for driving a first timer mechanism, piston means positioned within said housing in spaced relationship with said sleeve element and movable therein in the direction of said sleeve element in response to the application of rocket propulsion gas pressure forces, and coil spring means positioned between said piston means and said sleeve element, whereby upon the actuation of said piston means toward the sleeve element for compression of said spring means therebetween, the compressed spring means functions to drive the sleeve element within the cavity and thereby drive the timer.

3. The device of claim 2, further including a first plunger concentrically mounted within said sleeve element and having a reduced portion extending beyond the end of the sleeve element most remote from said piston means, second spring means positioned within said sleeve element and disposed for urging said piston toward said remote end of the sleeve element, third spring means within said housing for urging said sleeve element toward said piston means, and means responsive to the movement of said plunger for driving a second timer mechanism.

4. The device of claim 3 wherein said housing and said sleeve elements are provided with openings individual thereto and which are aligned in the unarmed condition, and said first plunger is provided with a hole in the portion thereof positioned within said sleeve element, and said first locking means comprises a second plunger extending through said openings and into said hole.

5. The device of claim 4 wherein said means for unlocking said first locking means comprises circuit means including an intent-to-launch switch means, an umbilical connector between the missile and the launching aircraft and a solenoid, which when energized withdraws said second plunger from its locked position.

6. The device of claim 3 wherein the means for driving the timer mechanism comprises separate rack portions carried by said sleeve element and said piston, a plurality of one way clutch elements individual to and cooperating with each respective rack portion and with the respective timer mechanisms for driving said timer mechanisms when the sleeve element and plunger are moved in response to actuation of said piston means.

7. The device of claim 4 wherein said plunger is provided with means for driving a timer when unlocking said first locking means, and said timer is provided with means for urging said second plunger toward the locked position again upon the passage of a predetermined period of time.

* * * * *